Dec. 30, 1969 J. S. BRUGLER 3,487,163

TARGET PULSE ENHANCER AND AUTOMATIC GAIN CONTROL CIRCUIT

Filed Sept. 15, 1965

*INVENTOR.*
JOSEPH STEPHEN BRUGLER

*BY* V. C. MULLER
ATTORNEY.

United States Patent Office 3,487,163

Patented Dec. 30, 1969

3,487,163

TARGET PULSE ENHANCER AND AUTOMATIC GAIN CONTROL CIRCUIT

Joseph S. Brugler, China Lake, Calif., assignor to the United States of America as represented by the Secretary of the Navy Filed Sept. 15, 1965, Ser. No. 487,637

Int. Cl. H04n 5/38; G06g 7/12

U.S. Cl. 178—7.2 3 Claims

ABSTRACT OF THE DISCLOSURE

An automatic gain control circuit for use in a control system which synchronously samples a periodic video pulse wave consisting of a TV camera output over the camera's raster period. The video signal is applied to one end of an autotransformer having its center tap returned to A.C. ground through a D.C. blocking capacitor. The ends of the autotransformer are connected to a diode full wave rectifier, and the output of the full wave amplifier is amplified by a video amplifier to provide the A.G.C. signal. A high gain negative feedback channel consisting of a pulse stretcher and an integrator having a sharp step function threshold of operation provides a D.C. feedback signal to the center tap of the autotransformer, which suppresses secondary pulses in the period the TV signal is sampled.

The invention described herein may be manufactured and used by or for the Government of the United States of America for governmental purposes without the payment of any royalties thereon or therefor.

This invention relates to an automatic signal level control circuit for use in signal systems in which a portion of a pulse train wave is a periodically gated, or "unblanked," by a square wave gate signal. The circuit is of particular utility in a television target tracking system, such as that disclosed in the copending application of Jack A. Crawford et al., Ser. No. 224,594, filed Sept. 12, 1962.

One object of the invention is to provide a circuit which takes a synchronously gated portion of a pulse train wave and enhances the largest pulse present therein, and suppresses any other pulse or pulses therein.

Another object is to provide a circuit in accordance with the previous objective, and which automatically establishes a level which a signal pulse must exceed in order to be amplified.

A further object is to provide an automatic signal level control circuit of particular utility in connection with a television target tracking system, of the type in which the system is responsive to an extremely small energy level of error signal, which comes from a very small "window area" of the total area of the television camera's raster pattern.

A still further object is to provide a circuit in accordance with the previous objective and which further serves as a full wave rectifier and therefore is of special utility in connection with a television target tracking system which is responsive to a television camera output video signal that has been further passed through a differentiator circuit.

Other objects and many of the attendant advantages of this invention will be readily appreciated as the same becomes better understood by reference to the following detailed description when considered in connection with the accompanying drawings wherein.

Figures 1, 2, 3:
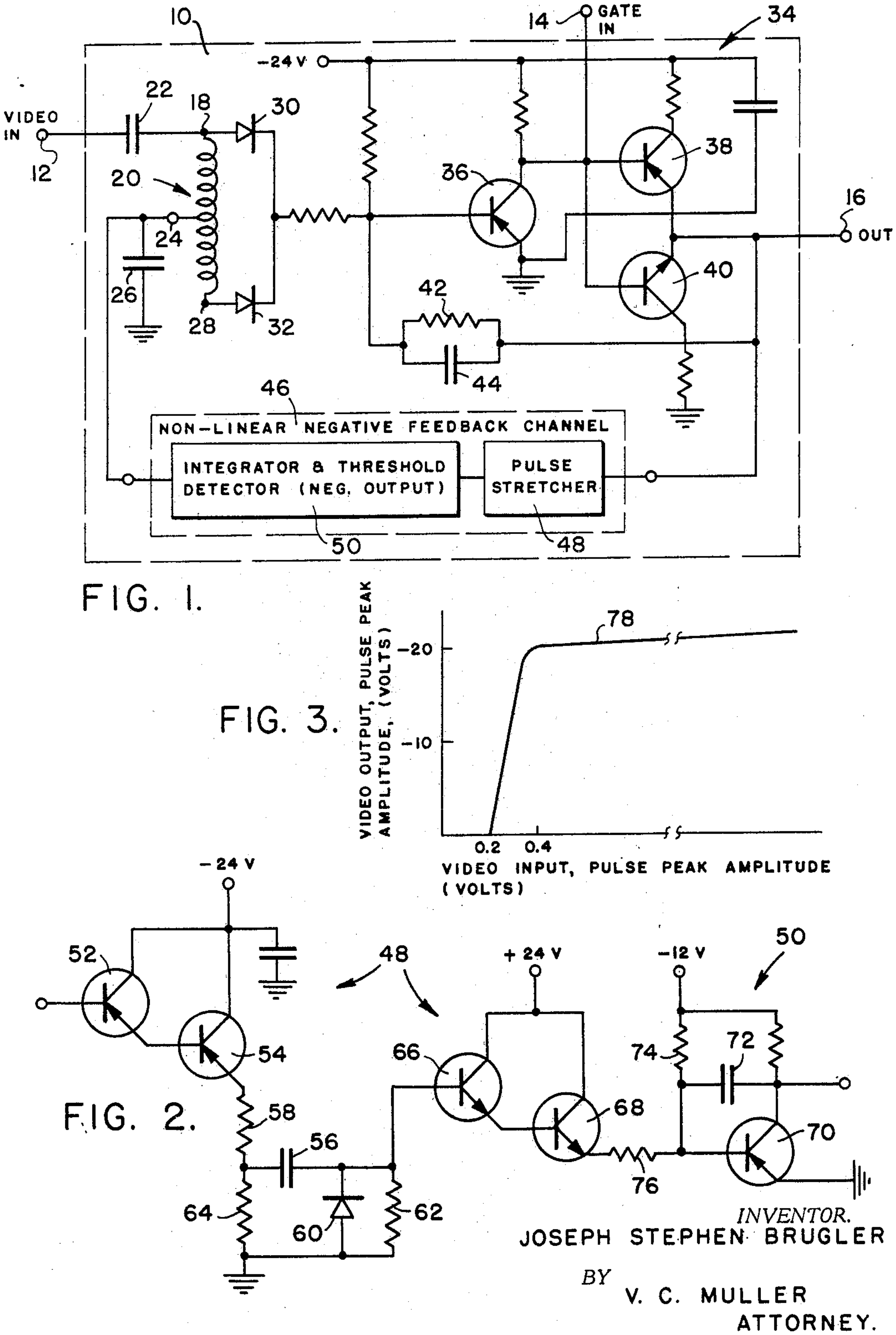
FIG. 1 is an electrical schematic of an automatic signal level control circuit embodying the present invention.
FIG. 2 is a circuit diagram of the negative feedback channel indicated by block in FIG. 1.
FIG. 3 is a graph illustrating the input-output transfer characteristics of the circuit of FIG. 1.

Referring now to the drawing, and in particular to FIG. 1, a circuit 10 is a pulse contrast enhancer and automatic gain control circuit, which is also adapted to perform the functions of a full wave rectifier and gate circuit. It is used in the television target tracking system disclosed in the previously referenced copending application. That tracking system is an automatic feedback control system of the so-called "sampled data" type. The input to the tracking system is the video signal energy which results from the periodic scanning of a television camera. The control action which the tracking system provides is to maintain the television camera axis directed at a small object in the image under scan by the television camera tube, or alternatively to maintain the axis directed at a predetermined point substantially along the edge of a large object in the image under scan. The scanning action, referred to, is the conventional broadcast television raster pattern scanning consisting of a square area at the image plane of the camera tube, which is under scan of a multiplicity of uniformly spaced "horizontal" scan sweep lines. More particularly, the tracking system is of a type which is responsive only to image objects in a small electronically defined square window area, termed the "tracking cell" in said copending application. This window area is small relative to the total image area being scanned. The window area typically has side dimensions which are one-fortieth the side dimensions of the total image area under scan. Briefly, the small window area is defined by horizontal and vertical window gate pulse signal networks, each consisting of suitable timing and multivibrator circuitry to generate a window gate pulse signal in predetermined timed synchronism with the start of the television camera's horizontal and vertical sweep deflections. Coincidence of the window gate pulse signals of the horizontal and vertical networks define those intervals of the raster scan period at which the portion of the total image area that is within the window area is under scan. Only the video signals present at the output of the television camera during those intervals of time are employed in the control action, this interrupted signal constituting the previously referred "sampled data." The system mode of operation for keeping the camera axis directed toward the center of area of a small object, or toward the edge of a large object includes passing the video signal output of the camera through a combined high-pass filter and differentiator circuit which differentiates video pulse signals below a nominal predetermined upper frequency limit, and unmodifiedly passes the video pulse signals above the upper frequency limit. The upper frequency limit is so chosen that for the case of objects smaller than the window area the resultant relatively high frequency video pulse passes through the circuit unmodified, and accordingly the pulse output from the circuit will represent the object itself. For the case of an object larger than the window area, the change in video signal level corresponding to the change in light-tone at the edge of the object will be differentiated, producing a "spike" pulse, which corresponds to the edge of the object. The pulse energy from the output of the combined high pass filter and differentiator circuit is fed to horizontal and vertical discriminator channels which provide an error signal linearly related to the position of the pulse energy relative to the center of the horizontal or vertical dimensions of the window area (these dimensions being electronically represented by the corresponding window gate pulses in the discriminator channels). By application of the outputs of these discriminator channels to suitable servo positioners in the well known relationship of negative feedback control, the control action tends to maintain the camera directed at the center of area of a smaller object, or alternatively at the edge of a larger object. The tracking system has a further feature permitting it to track either of a light object in a dark field, or a dark object in a light field. For these respective situations the output from the combined high-pass filter and differentiator will be of opposite polarities. To enable the control action electronics to process signals for both these types of situations, a full-wave rectifier stage is provided between the output of the filter and differentiator circuit and the discriminator channels. The output of the combined high pass filter and differentiator circuit is applied to a video input terminal 12. Window gate pulse signals are applied to a gate input terminal 14. This gate signal is produced by suitable coincidence logic circuitry, not shown, operatively associated with horizontal and vertical window gate pulse signal networks to provide an "open" signal during the intervals the image within the window area is under scan. The logic circuitry provides a low impedance shunt path to ground except during the periods in which a coincidence gate is open. During the times in which a coincidence gate is open, the logic circuitry presents a high impedance to terminal 14. The resultant interrupted periods in which the logic circuitry presents high impedance to terminal 14 constitute "unblanking" signals. The unblanking signals define the corresponding intervals of the total video pulsed train wave which are the samples to which the control sysetem is responsive. Circuit 10 has an output terminal 16 coupled to the horizontal and vertical discriminator channels. As will be presently understood, circuit 10 not only provides pulse enhancing and A.G.C. action, but additionally serves in the tracking system to gate the video signal to pass only intervals of the raster scan within the window area, and serves to full wave rectifiy the output of the filter and differentiator circuit.

Input terminal 12 is connected to a terminal end 18 of a center tapped input winding 20, through a coupling capacitor 22. The center tap terminal 24 of the winding is connected to ground through a D.C. blocking capacitor 26. Winding 20 serves as an autotransformer. The portion of the winding extending from end terminal 18 to center tap terminal 24 forms the primary winding element of the autotransformer, and the portion of the winding extending from center tap terminal 24 to the other end terminal 28 forms the secondary winding element of the transformer. A pair of diodes 30 and 32 have their anodes connected to end terminals 18 and 28, respectively, and have their cathodes connected together, forming a full wave rectifier network in cooperation with the autotransformer. The rectified signal at the cathodes of the diodes is fed to a video, or D.C. amplifier circuit 34. Amplifier 34 is of conventional transistor type providing a single ended negative polarity output, and comprising an input transistor 36 and a complementary pair of output transistors 38 and 40. The emitters of transistors 38 and 40 are connected together and to ouput terminal 16. the gate control input terminal 14 is connected to the commonly connected base electrodes of transistors 38 and 40. The gate signal applied to terminal 14 thus shorts the bases of the amplifier's output stage to ground during the low impedance portion of the gate signal, and thereby blanks out any output at terminal 16. During the high impedance portion of the gate signal, amplifier 34 operates to amplify and pass the signal, and the output at terminal 16 is unblanked. Parallel connected resistor 42 and capacitor 44 form a negative feedback path coupling the emitters of transistors 38 and 40, and the base of transistor 36. Amplifier 34 is characterized by a very wide bandwidth, extending down to zero frequency, and is characterized by a low output impedance over a large dynamic signal range.

A non-linear feedback channel 46, comprises a high gain pulse stretcher stage 48 and a threshold detector and integrator stage 50, both shown in block diagram in FIG. 1. Feedback channel 46 couples the output of video amplifier 34 to center tap terminal 24 of input winding 20. A detailed circuit diagram of feedback channel 46 is shown in FIG. 2. It is to be noted, however, that the direction of signal flow in the circuit diagram of FIG. 2 is from left to right, whereas the flow through the corresponding blocks of FIG. 1 is from right to left. The input of pulse stretcher stage 48 is a pair of PNP type transistors 52 and 54 in which the emitter of the first is connected to the base of the second, and in which the collectors of the pair are commonly tied together and returned directly to the collector supply. This arrangement, sometimes referred to as a Darlington connected emitter follower, has a current gain which is equal to the product of the gains obtainable by the transistors, individually. Such a stage is also a highly effective impedance transforming buffer. The Darlington connected transistors charge a capacitor 56 to a potential in accordance to the peak amplitude of the pulse at terminal 16. The charge circuit comprises a resistor 58, capacitor 56, which is the capacitor being charged, and a diode 60 which is forward biased by the negative pulse output of the Darlington connected PNP stage. Resistor 58 cooperates with capacitor 56 to provide a low pass filtering action to eliminate high frequency noise spikes which would otherwise cause deleterious effects at the high gains at which the circuit operates. When the pulse output is no longer present, diode 60 is no longer forward biased and the discharge path for the capacitor consists of a discharge current limiting resistor 62 of a very large predetermined value of resistance, ground return, and the emitter resistor 64 of transistor 54. The potential to which capacitor 56 is charged declines exponentially, providing a pulse stretching action which converts the peak value of the video pulse to a corresponding peak value of the longer duration exponentially declining waveform. The latter waveform is, in turn, amplified by a pair of Darlington connected NPN transistors 66 and 68, forming an output buffer amplifier for the circuit. The amplified exponentially declining waveform at the emitter of transistor 68 provides sufficient signal power to operate the feedback channel. Integrator stage 50, following, is a conventional Miller integrator circuit comprising a PNP transistor 70 and a feedback capacitor 72 connected between its collector and base. A negative voltage source is coupled to the base of transistor 70 through a resistor 74 of predetermined value, and the emitter of transistor 68 is also coupled to the base of transistor 70 through another resistor 76 of predetermined value. In absence of a predetermined level of output of signal from the pulse stretcher circuit, the negative potential drives transistor 70 into a saturated state of conduction. Saturation of transistor 70, in turn, produces an essentially zero output at the collector of transistor 70, which is the output of the integrator stage. When the average output level of the interrupted waveform at the emitter of transistor 68 reaches a predetermined level it drives transistor 70 from a state of saturation into an active region of the transistor's operating characteristics, and thereupon the collector of integrator transistor 70 is driven negative, producing a negative D.C. output voltage. Thus, the coupling and bias network between stages 48 and 50 cooperate to provide integrator circuit 50 with an input-output transfer characteristic shaped like a step function. This step function transfer characteristic provides a well defined detection threshold corresponding to a predetermined average level of the periodic exponential waveform at the output of pulse stretcher 48.

The operation of circuit 10 is as follows. Curve 78, FIG. 3, is the input-output transfer characteristic of circuit 10 between its input terminal 12 and its output terminal 16. The abscissa of the graph represents the peak value of the largest pulse, in the portion of the input wave at terminal 12 coinciding with the open gate condition of the gate signal at terminal 14. The ordinate represents the peak value of the same pulse as it appears at terminal 16 after precessing by circuit 10. The highly non-linear step shape of curve 78 is due to the step-function shaped transfer characteristic of integrator circuit 50, and corresponds to the detection threshold determined by the coupling and bias network at the input to integrator stage 50. When the peak value of such largest video pulse exceeds the detection threshold, the high gain, non-linear, feedback channel 46 applies a large negative feedback potential to the center tap terminal 24 of the input winding to back bias diodes 30 and 32. The gain of the feedback channel is sufficient to back bias the diode to suppress any video pulses of an amplitude less than that of the largest pulse in the open gate period. Also, the feedback potential is sufficiently high to limit the level at which the largest pulse appears at terminal 16. This is apparent from the plateau shape of curve 78, which indicates that the output pulse peak values are substantially constant for all values of input pulses in excess of the detection threshold. During those times in which there are no video pulses which reach the detection threshold level, feedback channel 46 is simply inoperative, and video amplifier 34 operates at its maximum gain.

In the case in which circuit 10 is employed in the television system of the above cited copending application, the shape of curve 78 is desired as a transfer curve for the following reasons. The output of circuit 10 is the input signal to the error discriminator of the tracking system. The bigger the output, the bigger the tracking errors. This means that the loop gain of the automatic tracking is proportional to the output level of signal 16. The 0.2 volt threshold is intentionally chosen to be equal to the RMS noise level of the incoming differentiated video. Any peak incoming signals below the level cannot be tracked since they produce no output 16. The tracking loop gain is zero for these signals. Incoming video above the upper "knee" of the curve results in essentially constant tracking loop gain. This is the primary purpose of automatic level control resulting in equal tracking facility over a wide range of target strengths. If the incoming video lies between the two knees of the curve, the tracking gain is proportional to the incoming video level. This gives the system an adaptive feature, in the sense that the tracking loop gain is a function of incoming video signal-to-noise ratio. If the incoming video signal has an undesirably low signal-to-noise ratio the tracking system is simply not responsive to it. As the signal emerges from the noise, the system commence to track it, first at reduced capability (low tracking gain) then, above the upper "knee" of the curve, with constant tracking gain.

The following list of components is included by way of example of the type and values of circuit components in a specific embodiment of circuit 10, which was employed in a television tracking system essentially like that disclosed in the previously cited copending application. In that system, the total duration of the periodic video pulse train wave applied to input terminal 12 is 16.7 milliseconds, and the duration of the open-gate periods are 2.6 milliseconds. The peak amplitudes of the video pulses in the bi-polar input signal are 0–12 volts.

| Component | Numeral | Type or value |
|---|---|---|
| Capacitor | 22 | 1.0 microfarad. |
| Do | 26 | 4.7 microfarad. |
| Diodes | 30, 32 | IN270 (germanium type). |
| Transistors | 36, 38 | 2N2635 (germanium type). |
| Transistor | 40 | 2N1613 (silicon type). |
| Resistor | 42 | 39K ohm. |
| Capacitor | 44 | 5 picofarad. |
| Transistors | 52, 54 | FSP–93 (silicon type). |
| Capacitor | 56 | .01 microfarad. |
| Resistor | 58 | 39 ohm. |
| Diode | 60 | IN643 (silicon type). |
| Resistor | 62 | 1.0 megohm. |
| Transistors | 66, 68 | FSP–119 (silicon type). |
| Transistor | 70 | 2N1305 (germanium type). |
| Capacitor | 72 | 47.0 microfarad. |
| Resistor | 74 | 5.6K ohm. |
| Do | 76 | 3.0K ohm. |

Obviously many modifications and variations of the present invention are possible in the light of the above teachings. It is therefore to be understood that within the scope of the appended claims the invention may be practiced otherwise than as specifically described.

What is claimed is:

1. An unblanking gate and pulse contrast enhancer and automatic signal level control circuit, said circuit receiving as the inputs thereof a first input signal consisting of a periodic pulse train wave, and a second input signal consisting of a square wave gate signal of appreciably shorter duration than the period of the first input signal and timed in synchronous relationship thereto, said circuit comprising;

(a) an input winding having a first terminal forming the input for receiving the first input signal and a second terminal connected to ground through a direct current blocking capacitor to form a return to signal ground, (b) a fixed gain, single ended video amplifier and gate stage, said amplifier and gate stage having a signal input terminal, a gate control input terminal for receiving the second input signal, and an output terminal, and operative to pass and amplify the signal appearing at its input terminal only during the duration of the square wave of the second input signal, (c) a first diode connected between the first terminal of the input winding and the signal input terminal of the amplifier and gate stage and poled in a predetermined relationship of diode polarity relative to the winding terminal and the amplifier and gate stage terminal, and (d) a high gain negative feedback channel connected between the output terminal of the amplifier and gate stage and the second terminal of the input winding, said negative feedback channel being operative to apply a direct current output to said second terminal to back bias said diode, whereby the largest pulse present in the first input signal and coinciding in time with the duration of the square wave of the second signal, tends to be enhanced and amplified to a desired predetermined peak amplitude, and any other such coinciding pulse or pulses smaller than the largest pulse tend to be suppressed.

2. A circuit in accordance with claim 1, (e) said high gain negative feedback chanel being of a non-linear type having an approximately step shaped input output transfer characteristic to provide a predetermined threshold of feedback circuit operation, whereby the amplifier and gate stage operates at a maximum gain except when a pulse of a magnitude at least equal to the feedback circuit's threshold of operation is present in the first input signal.

3. A circuit in acocrdance with claim 2, and wherein said pulse train wave of the first input signal consists of a train of video pulses of one and the other of opposite pulse polarities produced by passing the output of a television camera through a differentiator, and wherein (f) said input winding further forms an autotransformer in which the first terminal is at one of the ends of the winding and forms the signal input of the primary portion of the autotransformer, the second terminal forms the tap between the primary and secondary portions of the autotransformer, and a third terminal is at the other end of the winding and forms the output terminal of the secondary portion of the autotransformer, (g) a second diode is connected between the third terminal of the input winding and the signal input of the amplifier and gate stage and is also poled in said predetermined relationship relative to the winding terminal and the amplifier and gate stage terminal to cooperate with the first diode and the autotransformer to provide full wave rectification of the bi-polar video pulse train in passing it to the amplifier and gate stage, whereby said high gain negative gain feedback channel also back biases the second diode, and (h) said high gain negative feedback channel comprises a pulse stretcher stage connected to an integrator stage through an integrator threshold network, said integrator stage being of the operational type having an integrator capacitor connected between the output and input terminal of an amplifying device and having a bias means coupled to the input terminal of the amplifying device to bias same to operate in the state of saturated conduction, said integrator threshold cooperating with the bias means to overcome the bias and cause the amplifier device to operate in a state of less than saturated conduction in response to a predetermined average output level from the pulse stretcher stage to provide said approximately step-shaped transfer characteristic.

References Cited

UNITED STATES PATENTS

| | | | |
|---|---|---|---|
| 3,370,248 | 2/1968 | Treu | 328—209 |
| 3,414,667 | 12/1968 | Tanner | 172—7.2 |

ROBERT L. GRIFFIN, Primary Examiner

JOSEPH A. ORSINO, Jr., Assistant Examiner

U.S. Cl. X.R.

325—410; 328—142, 209; 330—28, 110